(12) United States Patent
Ta

(10) Patent No.: US 10,463,191 B2
(45) Date of Patent: Nov. 5, 2019

(54) EDDY STEAM TIP/EDDY FROTHING NOZZLE

(71) Applicant: Huy Tan Ta, Baldwin Park, CA (US)

(72) Inventor: Huy Tan Ta, Baldwin Park, CA (US)

( * ) Notice: Subject to any disclaimer, the term of this patent is extended or adjusted under 35 U.S.C. 154(b) by 677 days.

(21) Appl. No.: 15/209,752

(22) Filed: Jul. 13, 2016

(65) Prior Publication Data

US 2018/0014687 A1    Jan. 18, 2018

(51) Int. Cl.
*A47J 31/44* (2006.01)

(52) U.S. Cl.
CPC ................................. *A47J 31/4489* (2013.01)

(58) Field of Classification Search
CPC .... Y10S 261/76; Y10S 261/16; A47J 31/4489
USPC ............ 99/287, 293, 323.1; 366/101, 137.1; 261/DIG. 16, DIG. 76
See application file for complete search history.

(56) References Cited

U.S. PATENT DOCUMENTS

| | | | | |
|---|---|---|---|---|
| 3,952,362 A * | 4/1976 | Torii | ........................ | A47L 9/02 15/353 |
| 4,097,366 A * | 6/1978 | Tanaka | .................. | B01J 8/0278 208/127 |
| 5,233,915 A * | 8/1993 | Siccardi | .............. | A47J 31/4489 239/520 |
| 5,785,256 A * | 7/1998 | Mahlich | .............. | A47J 31/4489 239/552 |
| 6,443,374 B1 * | 9/2002 | Astachow | ............ | F02M 61/184 239/533.2 |
| 8,960,080 B2 * | 2/2015 | Saito | .................... | A47J 31/4489 261/DIG. 16 |
| 2014/0299003 A1 * | 10/2014 | Cingolani | ........... | A47J 31/4489 99/453 |

* cited by examiner

*Primary Examiner* — Dana Ross
*Assistant Examiner* — Joseph W Iskra
(74) *Attorney, Agent, or Firm* — Changi Wu; Changi Wu Law Office

(57) ABSTRACT

A steam tip for frothing milk foams comprises a tip body, a connector for connecting to a steam source providing a steam flow, wherein the tip body is hollow inside, wherein the tip body further comprises at least a top side, at least a bottom side, and at least two lateral sides, wherein the connector is on the top side of the tip body, wherein each of the at least two lateral sides forms an angle with the bottom side of the tip body between about 0 degree and about 90 degrees, and wherein at least one steam outlet is formed on each of said at least two lateral sides of said tip body.

5 Claims, 3 Drawing Sheets

EDDY STEAM TIP/EDDY FROTHING NOZZLE

CROSS-REFERENCE RELATED TO RELATED APPLICATIONS

This application claims the benefit and the priority of U.S. Provisional Application No. 62/315,672, filed Mar. 31, 2016, which is hereby incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

It is common known and seen that espresso machines or coffee makers equipped with a steam tube with nozzle to inject steam air into milk in a liquid container such as milk mug or milk jar. The effect of injecting steam air into milk is to heat up the milk and froth the milk to produce milk foams. The steam tube normally has one steam nozzle or steam tip. The steam nozzle has at least one steam hole allowing steam to be emitted from the inside of the steam tube, through the steam hole, and into the liquid container. The steam hole normally is a round shape hole, but it can be in other shape, such as triangle, square, and oval. When froth milk, the steam nozzle is submerged into the liquid container and allows the steam to mix and stir the milk.

When frothing milk, it is important to swirl and fold the milk in a circular motion in order to produce a smooth, even consistency and texture of foams. If there is no swirl and folding in a circular motion, the air and milk does not fully incorporate into each other, which will produce low quality frothed milk with large separated bubbles.

The conventional structure steam nozzle normally is configured with steam hole(s) oriented axially the steam tube. The steam exiting the steam outlet only in an axial direction into the liquid container with milk. This conventional design has several disadvantages that the direct stirring and/or heating area is relatively small and the steam hit the bottom of the liquid container directly. As a result, the conventional steam nozzle will only has vertical regional flow, which will not create a circular motion along the liquid container that folds and swirls the milk to produce good milk foams.

BRIEF SUMMARY OF THE INVENTION

This brief summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims.

The subject matters of this application overcomes the aforementioned problems and can produce steam into milk that can swirl and fold the milk to make milk foams. The invention is directed to a steam tip for frothing milk foams comprising a tip body, a connector for connecting to a steam source providing a steam flow, wherein said tip body is hollow inside, wherein said tip body further comprises at least a top side, at least a bottom side, and at least two lateral sides, wherein said connector is on said top side of said tip body, wherein each of said at least two lateral sides forms an angle with said bottom side of said tip body between about 0 degrees and about 90 degrees, and wherein at least one steam outlet is formed on each of said at least two lateral sides of said tip body.

BRIEF DESCRIPTION OF THE DRAWINGS

It should be understood that the drawings are merely representative, are not necessarily drawn to scale, and are not intended to limit the subject matter of this application.

DETAILED DESCRIPTION

Figure 1:
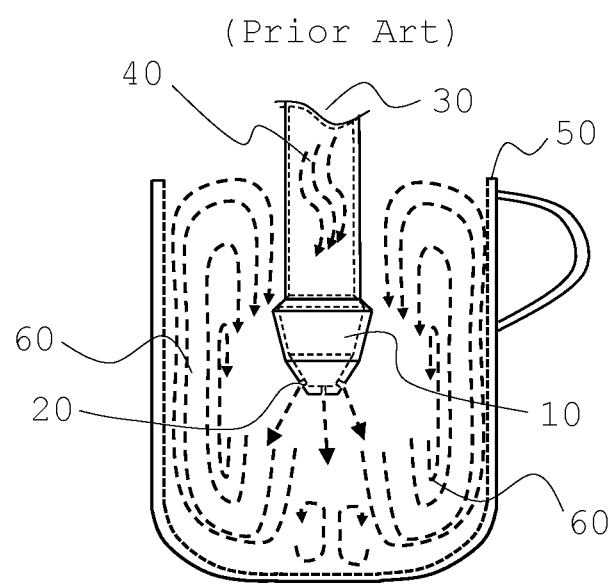
FIG. 1 is a side view of one prior art of steam nozzle.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Referring to FIG. 1, a prior art of steam nozzle 10 commonly available in the market has steam holes 20, which are arranged centrically to the center of the steam nozzle 10, point radially outward from the center of the steam nozzle 10, and direct downward to the liquid container 50. The steam pipe 30 delivers steam air 40 down to the steam nozzle 10. The steam air 40 is ejected from the steam holes 20 downward and outward. The steam air 40 produces a flow turbulence 60 in a small region up and down the liquid container 50, which the up and down flow turbulence 60 may cause splashing out of milk and produce separate big bubbles.

Figure 2:
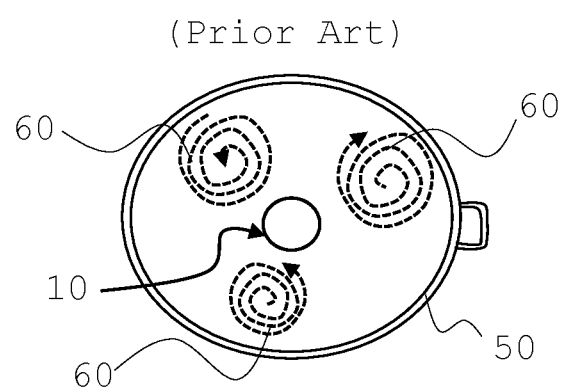
FIG. 2 is a top view of flow turbulences by one prior art of steam nozzle in a liquid container.

Referring to FIG. 2, a top view of the liquid container 50 during the operation of the prior art of steam nozzle 10. The flow turbulence 60 created by the steam nozzle 10 is limited in small regions and cannot swirl and fold milk in the liquid container 50.

Figure 3:
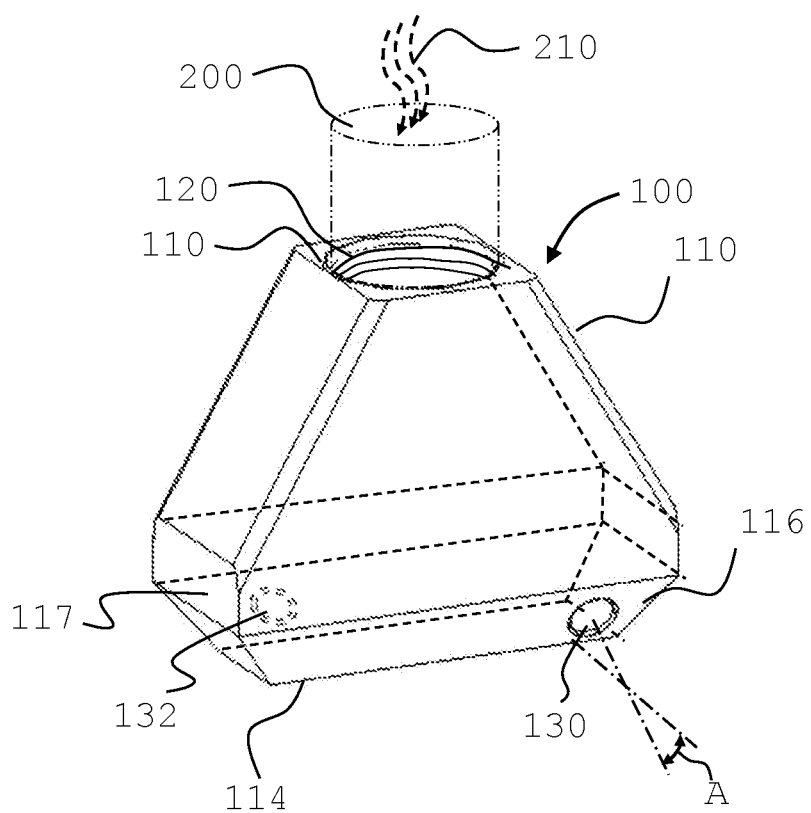
FIG. 3 is a perspective view of one preferred embodiment of the steam tip.

Referring to FIG. 3, one preferred embodiment of the steam tip 100 for frothing milk foams comprises a tip body 110, a connector 120 for connecting to a steam source 200 providing a steam flow 210, wherein said tip body 110 is hollow inside, wherein said tip body 110 further comprises at least a top side 112, at least a bottom side 114, a first lateral side 116, and a second lateral side 117, wherein said connector 120 is on said top side of said tip body 110, wherein said first lateral side 116 forms an angle A with said bottom side 114 of said tip body 110 between about 0 degree and about 90 degrees, wherein said second lateral side 117 forms an angle B with said bottom side 114 of said tip body 110 between about 0 degree and about 90 degrees, but preferable between about 30 degrees and 60 degrees, wherein first steam outlet 130 are formed on said first lateral side 116 of said tip body 110, wherein second steam outlet 132 are formed on said second lateral side 117 of said tip body 110, wherein each of said first steam outlet 130 is opposed to said second steam outlet 132. Said first steam outlet 130 and said second steam outlet 132 can be different shape and size, but preferably are in identical shape to each other.

Also referring to FIG. 3, the one embodiment of the tip body 110 can be in any shape, such as but not limited to, triangular trapezoidal prism, rectangular prism, hexagonal prism, cuboid, pyramid, cube, circular sphere, cylinder, cone, ball shape, or ovoid. The steam outlets 130 can be any shape, such as but not limited to, circle, square, triangle, rectangle, rhombus, parallelogram, hexagon, trapezoid, octagon, or long slot. The connector 120 can be many different mechanical connection type, such as but not limited to, screw type, coupling type, clamp type, socket type, and nipple type. The material for the tip body 110 can be any material that is safe for food processing and can sustain in high pressure and high temperature environment, such as but not limited to, stainless, copper, tempered glasses, glass fibers, and high density plastics.

Figure 4:
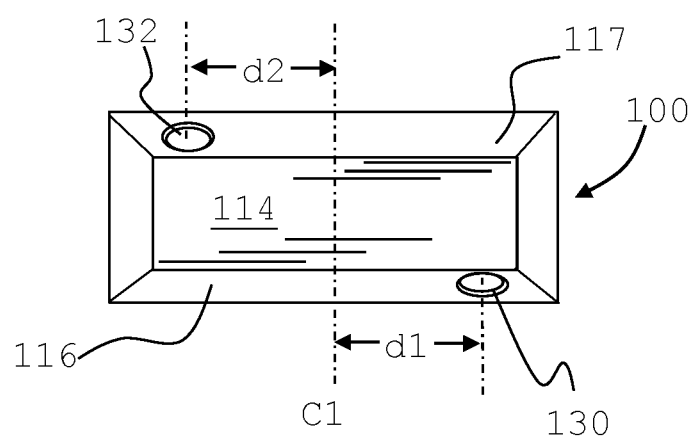
FIG. 4 is a bottom view of one preferred embodiment of the steam tip.

Referring to FIG. 4, a bottom view of one of the preferred embodiment of the steam tip 100, wherein said tip body 110 further comprises a center C1, and wherein each said first steam outlet 130 has a first offset d1, wherein said second steam outlet 132 has a second offset d2 from said center C1 of said tip body 110, where first offset d1 can be same or different from second offset d2, but preferably same to each other.

Figure 5:
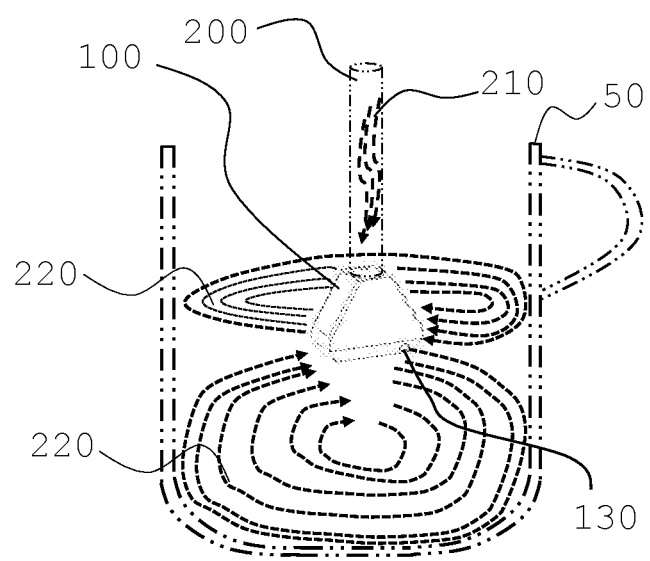
FIG. 5 is a side view of one preferred embodiment of the steam tip in a liquid container.

Referring to FIG. 5, a side view of the operation of one of the embodiment of the steam tip 100 in a liquid container 50. The steam flow 210 delivered by steam source 200 is emitted into the liquid container 50, and swirls 220 is created to be in a circular motion to fold and incorporate milk with air in the liquid container 50.

Figure 6:
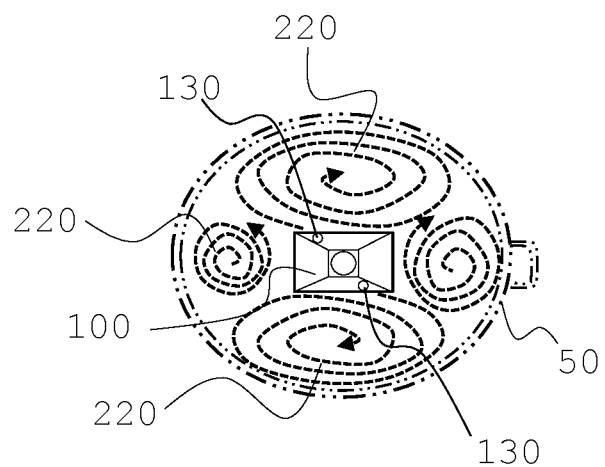
FIG. 6 is a top view of the circular motion of liquid flow by one preferred embodiment of the steam tip in a liquid container.

Referring to FIG. 6, a top view of one of the embodiment of the steam tip 100 in operation in a liquid container 50, wherein swirls 220 in a large region are created by at least two steam outlets 130, shows the steam tip 100 can better incorporate and fold milk during frothing milk foam.

What claimed is:

1. A steam tip for frothing milk foams of milk, comprising:
    a tip body,
    a connector for connecting to a steam source providing a steam flow,
    wherein said tip body is hollow inside,
    wherein said tip body further comprises at a top side, a bottom side, a first lateral side, a second lateral side,
    wherein said bottom side is a rectangular shape having two long parallel sides and two short parallel sides,
    wherein said first lateral side and said second lateral side are oppositely based on said two long parallel sides of said rectangular shape,
    wherein said connector is on said top side of said tip body,
    wherein said first lateral side forms an angle with said bottom side of said tip body between about 0 degrees and about 90 degrees,
    wherein said second lateral side forms an angle with said bottom side of said tip body between about 0 degrees and about 90 degrees,
    wherein a first steam outlet is formed on said first lateral sides of said tip body,
    wherein a second steam outlet is formed on said second lateral sides of said tip body, and
    wherein said first steam outlet is oppositely parallel to said second steam outlet,
    wherein said steam flow from said first steam outlet and said steam flow from said second steam outlet create a large region of swirls and folds in said milk to incorporate said steam flow with said milk.

2. The steam tip for frothing milk foams of claim 1, wherein said tip body further comprises a center, and wherein each said first and second steam outlets have different offsets from said center of said tip body.

3. The steam tip for frothing milk foams of claim 1, wherein said angle between said at least two lateral sides and said bottom side of said tip body is between about 30 degrees and about 60 degrees.

4. The steam tip for frothing milk foams of claim 1, wherein said connector is selected from a group of mechanical connection type consists of screw type, coupling type, clamp type, socket type, nipple type, and a combination thereof.

5. The steam tip for frothing milk foams of claim 1, wherein said first and second steam outlets have an identical shape to each other.

\* \* \* \* \*